United States Patent
Yoshida et al.

(10) Patent No.: US 10,529,478 B2
(45) Date of Patent: Jan. 7, 2020

(54) AIR CORE TYPE REACTOR UNIT AND ELECTRIC POWER SUPPLY EQUIPMENT HAVING AN AIR CORE TYPE REACTOR UNIT

(71) Applicant: Mitsubishi Electric Corporation, Chiyoda-ku, Tokyo (JP)

(72) Inventors: Toshihiro Yoshida, Tokyo (JP); Hajime Nakatani, Tokyo (JP); Daisuke Takauchi, Tokyo (JP); Takashi Kumagai, Tokyo (JP); Kenji Shimohata, Tokyo (JP); Taichiro Tamida, Tokyo (JP)

(73) Assignee: MITSUBISHI ELECTRIC CORPORATION, Chiyoda-Ku, Tokyo (JP)

( * ) Notice: Subject to any disclaimer, the term of this patent is extended or adjusted under 35 U.S.C. 154(b) by 0 days.

(21) Appl. No.: 16/319,830

(22) PCT Filed: Aug. 9, 2016

(86) PCT No.: PCT/JP2016/073399
§ 371 (c)(1),
(2) Date: Jan. 23, 2019

(87) PCT Pub. No.: WO2018/029773
PCT Pub. Date: Feb. 15, 2018

(65) Prior Publication Data
US 2019/0221354 A1    Jul. 18, 2019

(51) Int. Cl.
*H01F 27/08* (2006.01)
*H01F 27/28* (2006.01)
(Continued)

(52) U.S. Cl.
CPC ............. *H01F 27/08* (2013.01); *H01F 27/28* (2013.01); *H01F 27/29* (2013.01); *H02M 7/003* (2013.01); *H01F 30/08* (2013.01)

(58) Field of Classification Search
CPC .... H01F 27/2876; H01F 27/085; H01F 27/08; H01F 30/08; H02M 7/003
See application file for complete search history.

(56) References Cited

U.S. PATENT DOCUMENTS

| 3,195,082 A | 7/1965 | Wetherill et al. |
| 3,356,978 A | 12/1967 | Mugnier et al. |

(Continued)

FOREIGN PATENT DOCUMENTS

| DE | 1138156 B | 10/1962 |
| DE | 1172769 B | 6/1964 |

(Continued)

OTHER PUBLICATIONS

International Search Report (PCT/ISA/210) dated Oct. 25, 2016, by the Japan Patent Office as the International Searching Authority for International Application No. PCT/JP2016/073399.

(Continued)

*Primary Examiner* — Harry R Behm
(74) *Attorney, Agent, or Firm* — Buchanan Ingersoll & Rooney PC

(57) ABSTRACT

An air core type reactor unit, includes a first insulating plate which is provided with a first insulating spacer on one side, a first ferromagnetic member metal plate fixed to an insulating plate, two or more air core coils each having an air core part and formed of coil layers with the separation of an air gap, a second insulating plate, which is provided with a second insulating spacer on another side thereof and has a width smaller than an inside diameter of the coil, to incorporate more air into, a second ferromagnetic member metal (Continued)

plate fixed to an insulating plate, and an insulating stick passing through the air core part of the air core coils, wherein the air core coils are arranged in parallel, and held and fixed between the first insulating plate and the second insulating plate through the first insulating spacer and the second insulating spacer.

18 Claims, 12 Drawing Sheets

(51) Int. Cl.
*H01F 27/29* (2006.01)
*H02M 7/00* (2006.01)
*H01F 30/08* (2006.01)

(56) References Cited

U.S. PATENT DOCUMENTS

| | | | |
|---|---|---|---|
| 2007/0080769 A1* | 4/2007 | Thiel | H01F 3/14 336/65 |
| 2009/0121818 A1* | 5/2009 | Wagoner | H01F 27/365 336/58 |
| 2009/0212631 A1* | 8/2009 | Taylor | H02J 9/062 307/66 |
| 2010/0117776 A1* | 5/2010 | Israelsson Tampe | H01F 27/085 336/59 |
| 2013/0249303 A1* | 9/2013 | Keeling | H01F 27/022 307/104 |
| 2015/0170818 A1* | 6/2015 | Sharp | H01F 27/2876 336/60 |
| 2015/0262793 A1* | 9/2015 | Okunishi | H01J 37/32284 156/345.24 |
| 2016/0027568 A1 | 1/2016 | Takauchi et al. | |
| 2017/0366046 A1* | 12/2017 | Werner | B60L 53/12 |

FOREIGN PATENT DOCUMENTS

| | | | | |
|---|---|---|---|---|
| JP | S5138649 U | | 3/1976 | |
| JP | S5610912 A | | 2/1981 | |
| JP | 56152222 A | * | 11/1981 | H01F 30/08 |
| JP | S61104535 U | | 7/1986 | |
| JP | H09115743 A | | 5/1997 | |
| JP | H09199354 A | | 7/1997 | |
| JP | 2006173443 A | | 6/2006 | |
| JP | 2008-171850 A | | 7/2008 | |
| WO | 2015008359 A1 | | 1/2015 | |

OTHER PUBLICATIONS

Written Opinion (PCT/ISA/237) dated Oct. 25, 2016, by the Japan Patent Office as the International Searching Authority for International Application No. PCT/JP2016/073399.

Extended European Search Report dated Jul. 4, 2019, issued by the European Patent Office in corresponding European Application No. 16912656.2. (9 pages).

* cited by examiner $$L = \frac{1}{(2 \times \pi \times f)^2 \times C} \qquad \text{Equation (1)}$$

L: Reactance
f: Frequency
C: Electrostatic Capacity

AIR CORE TYPE REACTOR UNIT AND ELECTRIC POWER SUPPLY EQUIPMENT HAVING AN AIR CORE TYPE REACTOR UNIT

FIELD OF THE INVENTION

This invention relates to an air core type reactor unit, and more particular, relates to an electric power supply equipment which is well suited to a capacitive load, such as an ozone generator, and an air core type reactor unit which will be used in the electric power supply equipment.

BACKGROUND OF THE INVENTION

Ozone generators are loads with highly capacitive performance. In order to feed the ozone generator which works as a capacitive load, the electric power supply equipment which consists of large capacity components, such as a transformer, a reactor, an inverter and the like will be utilized. These components are fed with high voltages and generate a large quantity of heat, and hence, efficient cooling is required to these components. Inside of a panel board of the electric power supply equipment, a heat exchanger is provided and cooling the inside of the panel board is performed by way of the heat exchanger. The transformer, the reactor, and the inverter are expected to have a structure with high cooling efficiency.

In order to achieve the weight saving and cost reduction of the reactor which is to be used in the electric power supply equipment, the method of using an air core type reactor has been known. Air core type reactors have been devised, including one which has a winding wire of toroidal shape in order to hold down the leakage magnetic flux (for example, refer to Patent Documents 1 and 3); another which is manufactured with only a multi parallel line body, so that the magnetic fields of the coils, which lie next to each other, may become opposite in the direction (for example, refer to Patent Document 4); in addition, a third the periphery of which is covered with an electromagnetism shield (for example, refer to Patent Document 2); and the fourth which circulates magnetic fluxes using top to bottom bundle boards of steel plate or the like (for example, refer to Patent Document 5).

CITATION LIST

Patent Literature

Patent Document 1: JP S51-38649 A
Patent Document 2: JP S61-104535 A
Patent Document 3: JP S56-10912 A
Patent Document 4: JP H09-115743 A
Patent Document 5: JP H09-199354 A

SUMMARY OF THE INVENTION

Technical Problem

A reactor unit for the ozone electric power supply equipment will be used in the situations of high frequency, high current and high voltage. When the reactor unit employs an air core reactor, much advantage is gained in the aspects of cost and weight. Even so, from the aspects of heat generation by the leakage magnetic flux, dielectric withstanding voltage, and the like, it is difficult to store the reactor unit inside the case of the electric power supply equipment.

With regard to the toroidal like air core type reactor, a large sized product which is capable of producing an electric current as large as 100 A or so is difficult to manufacture. Moreover, the toroidal like air core reactor becomes too large in size on account of its toroidal like shape, and is unsuitable for the storage into the case of an electric power supply device (refer to Patent Documents 1 and 3).

As to the air core type reactor which is manufactured with only a multi parallel line body, so that the magnetic fields of the coils, which lie next to each other, may become opposite in the direction, when an enough distance is not kept between the coils, a spatial distance and a creepage distance for insulation become insufficient at, for example, a high voltage of 10 kV p, which is required for the drive of an ozone generator device. (refer to Patent Document 4).

In regard to the air core type reactor the periphery of which is covered with an electromagnetic shield, the electromagnetic shield needs to cover the overall periphery of the reactor. Because of the higher cost in materials, and in addition, due to the increased working hours, the product cost of the air core type reactor will be raised (refer to Patent Document 2).

As for the air core type rector which circulates magnetic fluxes using the top to bottom bundle boards of steel plate or the like, the reactor cannot be used under the conditions at a frequency of 500-5000 Hz and a current of 100 A, because the loss by an eddy current which occurs in the steel plate and the like is generated in large quantity and the reactor becomes very high in temperature. Furthermore, the use of the air core type reactor was impossible in a high voltage situation of 10 kV p from the aspect of the insulation performance (refer to Patent Document 5).

The present invention is made in order to solve the above mentioned subject matters in the air ore type reactors. The purpose of the present invention is to obtain an air core type reactor unit which is excellent in the heat radiation performance and can be used even under the conditions of high frequency, high current and high voltage.

Solution to Problem

An air core type reactor unit in accordance with the present invention is characterized in that, the reactor unit includes a first ferromagnetic member, an air core coil which is composed of two or more solenoid type coils and has an air core part, and a second ferromagnetic member whose width is smaller than an inside diameter of the air core coil. The second ferromagnetic member is manufactured to have a width smaller than an inside diameter of the air core coil, and the reactor unit is configured to have a structure where air flow can ventilate the second ferromagnetic member. Employing those configurations will improve the heat radiation performance.

The air core coil includes coil layers which are provided with an air gap in between, and air flow is made to pass through the air gap, and then, the coil will have improved heat radiation performance.

The air core type reactor unit is allowed to be used also under the situation of a high voltage, by holding an insulating spacer between air core coil fixing parts.

Advantageous Effects of Invention

The air core type reactor unit in accordance with the present invention, includes; a first insulating plate which is provided with a first insulating spacer on one side, a first air core coil that has a first air core part, a second air core coil that has a second air core part, a second insulating plate which is provided with a second insulating spacer on one side and whose width is smaller than an inside diameter of a coil, a first insulating stick which penetrates the first air core part of the first air core coil, and a second insulating stick which penetrates the second air core part of the second air core coil, wherein the first air core coil and the second air core coil are arranged in parallel and held and fixed between the first insulating plate and the second insulating plate, by way of the first insulating spacer and the second insulating spacer. Since the second insulating plate has a width smaller than an inside diameter of the coil, a second ferromagnetic member part gains easier access of the air flow, and then, the heat radiation performance of the reactor unit is improved. Moreover, a creepage distance and an insulation thickness, which are large enough to enable a high voltage output in the reactor unit, are secured through the insulating spacers and the like.

The air core coil has air gaps which are formed between respective layers of the coil layers. Accordingly, the air flow which passes through the air gaps improves the heat radiation performance of the coil.

The ferromagnetic member employs the one that consists of a plurality of boards. Since the boards are placed to have a space in between, the magnetic flux density in the air core type reactor unit is reduced and the iron loss can be lowered. Moreover, air flow, which is made to pass through the board spacings, can improve the heat radiation performance of the ferromagnetic member itself. Furthermore, it is also possible to lower the product cost by reducing the number of those boards.

The ferromagnetic member is configured to have a greater number of boards at the central part, and then, a uniform distribution of the magnetic flux density is attained in the air core type reactor unit. Accordingly, local heat generation of the ferromagnetic member due to the deviation of the magnetic flux density can be lowered.

DETAILED DESCRIPTION OF THE INVENTION

Hereinafter, embodiments of the electric power supply equipment and the air core type reactor unit according to the present invention will be described in detail with reference to drawings. It should be noted that the present invention is not limited to the descriptions given below and each of the embodiments can be appropriately modified without departing from the scope of the present invention.

Embodiment 1

Figure 1:
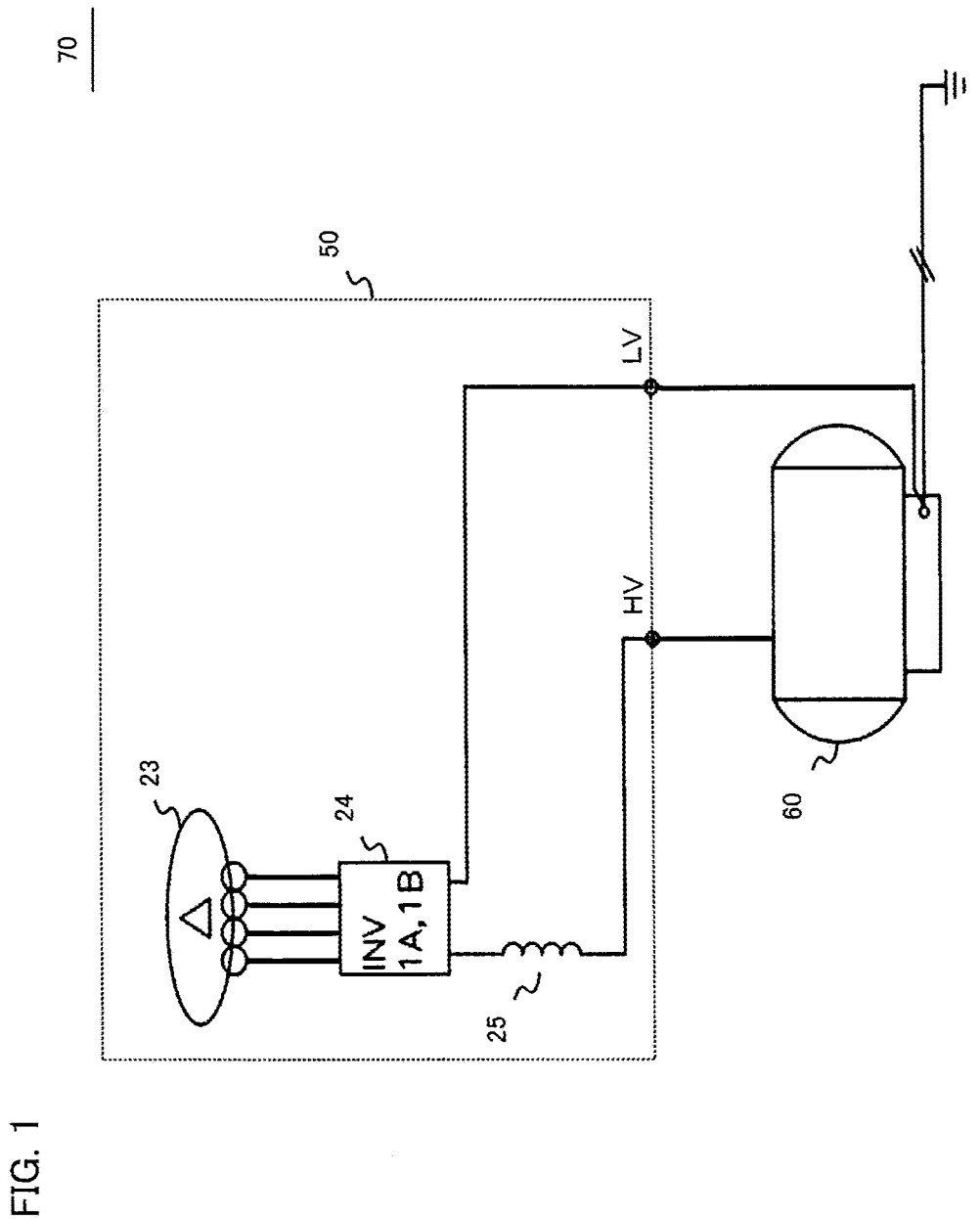
FIG. 1 is an overall view for showing the configuration of an ozone supply facility in the present invention.

Hereinafter, explanation will be made about the air core type reactor unit and the electric power supply equipment in accordance with Embodiment 1 of the present invention, with reference to drawings. FIG. 1 shows an example of the configuration of an ozone supply facility 70 in the present invention. The ozone supply facility 70 consists of an electric power supply equipment 50 and an ozone generator 60. The electric power supply equipment 50 consists of an input transformer 23, an inverter 24, an air core type reactor unit 25, and others. The input transformer 23 has four output lines, and outputs alternating current power. The output lines of the input transformer 23 are connected to the inverter 24. After rectifying alternating current power of commercial frequency, the inverter 24 switches the rectified power with semiconductor elements to generate a high frequency voltage. Output from the one end side of the inverter 24 is inputted into the air core type reactor unit 25. High voltage side output (HV) and low voltage side output (LV) of the electric power supply equipment 50 are connected to the ozone generator 60, which works as a capacitive load (or an electrostatic load).

Figure 2:
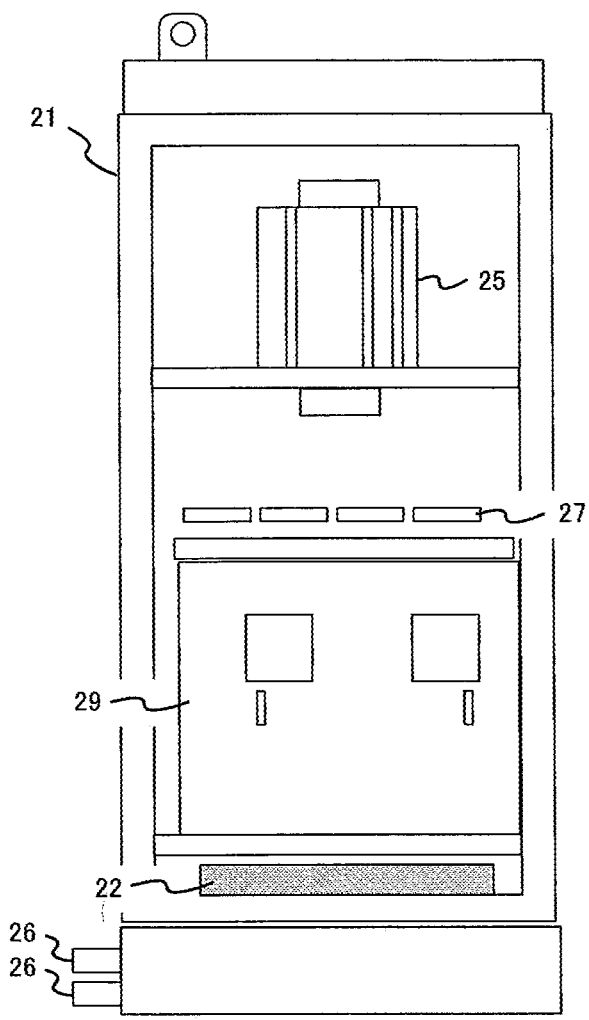
FIG. 2 is an elevational view for showing the electric power supply equipment according to the embodiments in the present invention.

The input transformer 23, the inverter 24, the air core type reactor unit 25, and the like are contained in a case. FIG. 2 illustrates an internal drawing of the electric power supply equipment 50 in accordance with the embodiments, when viewed from the front side. In the drawing, a main circuit case 21, a heat exchanger 22, an air core type reactor unit 25, a fan 27, a protective panel 29, and others are shown, which constitute the electric power supply equipment 50. The heat exchanger 22 is arranged at the lower part of the main circuit case 21. The protective panel 29 is arranged immediately above the heat exchanger 22. The air core type reactor unit 25 is arranged at a position higher than the fan 27. The input transformer 23, the inverter 24 and the like are arranged on the back side of the protective panel 29.

Figure 3:
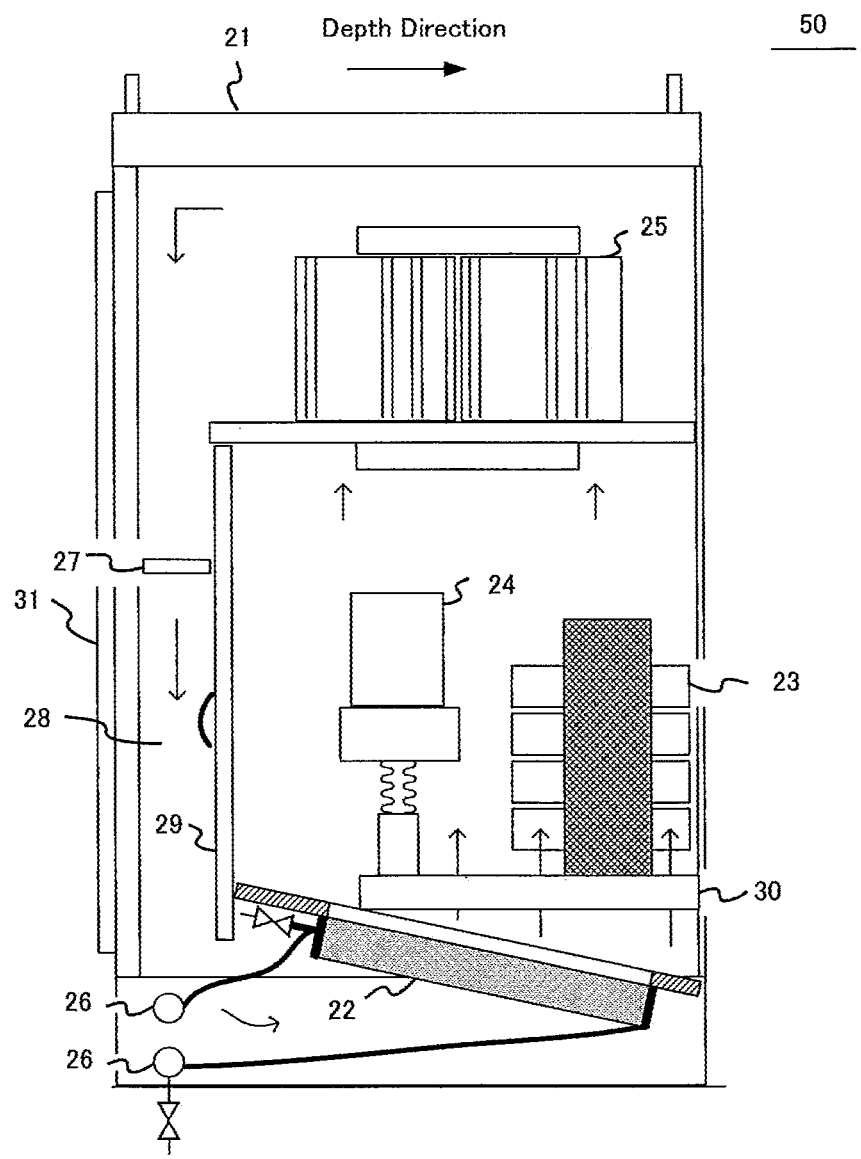
FIG. 3 is a side view for showing the electric power supply equipment according to the embodiments in the present invention.

FIG. 3 illustrates a sectional view for showing an inside of the electric power supply equipment 50 in accordance with the embodiments. A main circuit case 21, a heat exchanger 22, an input transformer 23, an inverter 24, an air core type reactor unit 25, cooling water pipe lines 26, a fan 27, a protective panel 29, an air flow path partition board 30, a door 31, and the like are shown in the drawing. The heat exchanger 22 is arranged at the lower part of the main circuit case 21. The air flow path partition board 30 is arranged directly above the heat exchanger 22. The board height is restrained, because the input transformer 23 and the inverter 24 are placed at the upper part of the air flow path partition board 30, and further arranged in the depth direction of the main circuit case 21. The air core type reactor unit 25 is arranged at the upper part of the input transformer 23 and the inverter 24. The air flow path 28 and the cooling water pipe lines 26 are provided at the front face of the main circuit case 21.

The air flow path 28 is constructed from the fan 27 and the protective panel 29. From the cooling water pipe lines 26, cooling water is supplied to the heat exchanger 22. The heat exchanger 22 is arranged with a downhill slope towards the panel board depth direction. A larger fluid channel, compared with the air flow path, is provided at the entrance side of the heat exchanger 22. A narrower fluid channel is provided at the exit side of the heat exchanger 22, and hence, the pressure loss of the air flow path is reduced. An arrangement is constructed where cooling aerial flow from the fan 27 is easy to flow also into the back face of the main circuit case 21, which is distant from the air flow path 28, provided at the front side of the main circuit case 21. The air flow path partition board 30 is provided directly above the heat exchanger 22. Because the cooling aerial flow tends to flow into the upper part of the main circuit case 21 through the heat exchanger 22, cooling of the cooling aerial flow can be achieved effectively.

The input transformer 23 and the inverter 24, which generate a large quantity of heat, are complicated in structure and difficult to cool down. Considering the situation mentioned above, the input transformer 23 and the inverter 24 are arranged right above the heat exchanger 22. Highest temperatures of the input transformer 23 and the inverter 24 can be lowered, because their cooling can be performed by the cooling aerial flow which is cooled down to the lowest level at the inside of the main circuit case 21. The input transformer 23 is arranged to have a separation of 5 mm to 50 mm, from the back face of the main circuit case 21. A back panel of the main circuit case 21 can be applied also as an air flow path, and an inside or an external surface of the input transformer 23 can accept the active passage of the cooling aerial flow. The distance between the back face of the main circuit case 21 and the input transformer 23 needs to be larger than a required insulation distance, which must be determined at least in light of the voltage that is applied to the input transformer 23.

The input transformer 23 and the inverter 24 are placed separately, also with a 5 mm to 100 mm distance in between. The back face of the inverter 24 can be employed also as an air flow path, and an inside or an external surface of the input transformer 23 can accept the active passage of the cooling aerial flow. The distance between the input transformer 23 and the inverter 24 needs to be larger than a required insulation distance, which must be determined at least in light of the potential difference that is applied to the input transformer 23 and the inverter 24. Because the input transformer 23 is heavy in weight, the gravity center of the main circuit case 21 moves to a lower position, when the input transformer 23 is arranged at the lower part of the main circuit case 21. Accordingly, advantages on the transportation vibration and on the earthquake resistant design will also be achieved.

The air core type reactor unit 25 is arranged at the upper part of the input transformer 23 and the inverter 24. Even if the air core L, which is light in weight, is arranged in the upper part of the main circuit case 21, the gravity center of the main circuit case 21 scarcely moves to an upper position. Accordingly, advantages on the transportation and earthquake resistant design will be attained. Cooling of the air core type reactor unit 25 is performed using the cooling aerial flow, which has already cooled the input transformer 23 and the inverter 24. Although temperatures of the cooling aerial flow are at a higher level, cooling of the air core type reactor unit can be performed using the whole cooling aerial flow that flows through the main circuit case 21. When the wind velocity is increased, efficient cooling can be attained. The inverter 24 will be fed with a high voltage.

A fan 27 is placed in the frontal middle of the main circuit case 21. The fan 27 is a component to which maintenance is indispensable, and then, the working efficiency at the time of the maintenance is promoted. A safe structure is constructed where accidental contact of the fan with the inverter 24 can be prevented, when the replacement of the fan 27 is performed, because a protective panel 29 is arranged between the fan 27 and the inverter 24. The protective panel 29 is installed in order to isolate the inverter 24, to which a high voltage is applied. The main circuit case 21 is equipped with a door 31.

The air flow path 28 is constructed from the protective panel 29 and the door 31, and does not have any structural members which are installed only for an air flow path. Because structural members are commoditized in the electric power supply equipment, the downsizing, simplification and cost reduction of the main circuit case 21 has been realized. Moreover, since the air flow path 28 is arranged at the front face of the main circuit case 21, the variation in temperature at the front face of the main circuit case 21 is reduced and the rise in temperature of the main circuit case 21 can be lowered. Accordingly, the safety level of the equipment is improved. Furthermore, because the overall body of the main circuit case 21 serves as an air flow path, the surface of the case becomes uniform in temperature. The main circuit case has a structure where dew condensation is hard to form, and then, the reliability of the case is improved.

Cooling water pipe lines 26 are held at a position lower than the heat exchanger 22. A structure is constructed where cooling water inside the heat exchanger 22 flows from a bottom level to a top level, and the water, which has passed through the inside of the heat exchanger 22, flows into the cooling water pipe line from the top level to the bottom level. The above mentioned structure enables the construction of the cooling water pipe line which is capable of avoiding the accumulation of air. Furthermore, water removal jobs, which are carried out at the time of a long term machine stoppage or the like, for the purpose of preventing the freezing of the cold water, can also be done easily.

Although efforts have been made on the air core type reactor unit 25 to lower the leakage magnetic flux, as will be mentioned later, the leakage magnetic flux therefrom is not zero. Accordingly, an interspace is provided between the main circuit case 21 and the air core type reactor unit 25, to reduce the heat generation of the case.

Figure 4:
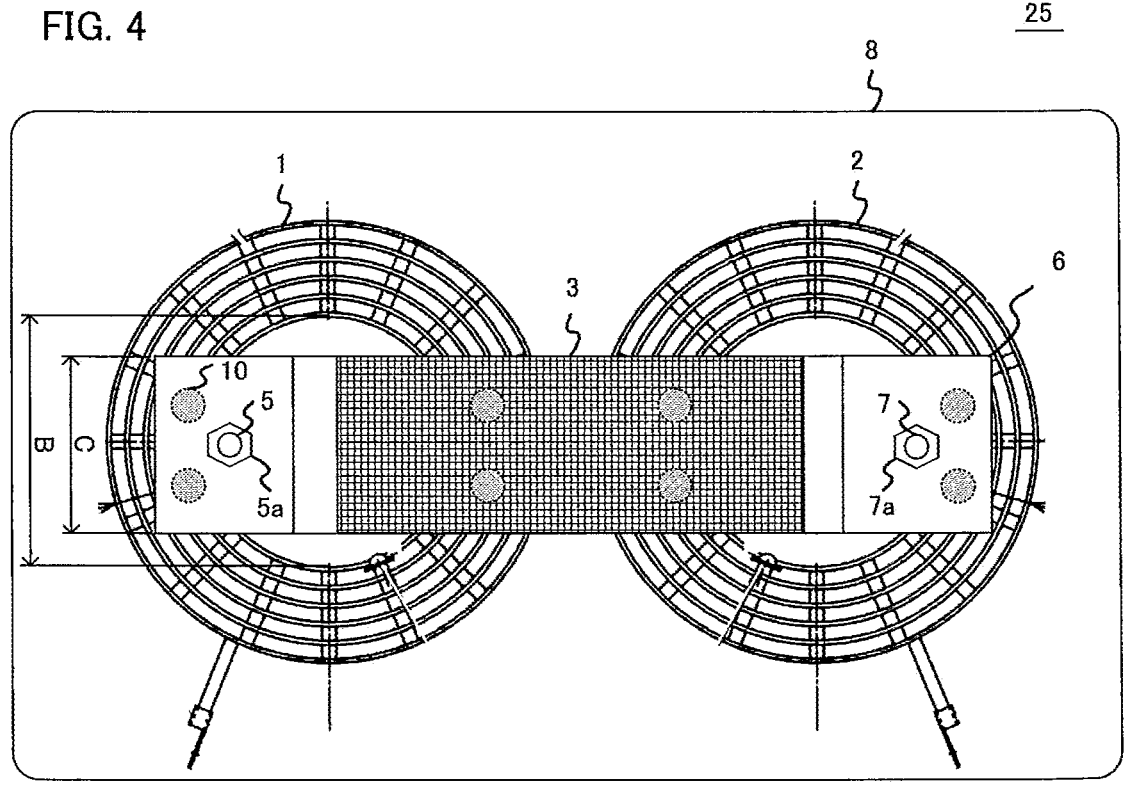
FIG. 4 is a plan view for showing an air core type reactor unit in connection with Embodiment 1.

FIG. 4 illustrates a plan view for showing an air core type reactor unit 25 in accordance with the embodiments of the present invention. The air core type reactor unit 25 consists of a first air core coil 1, a second air core coil 2, a second ferromagnetic member 3, a first insulating stick 5, a second insulating stick 7, a first insulating plate 8 (a lower side insulating plate), a second insulating plate 6 (an upper side insulating plate), and others. The first air core coil 1 and the second air core coil 2, which have been arranged in parallel, are electrically connected in series so that the directions of the magnetic flux may become opposite. The reactor of the air core type reactor unit 25 consists of a first air core coil 1 and a second air core coil 2. The first insulating stick 5, the second insulating plate 6, the second insulating stick 7, and the first insulating plate 8 are structural members for fixing the reactor. Because the second ferromagnetic member 3 has a width C which is smaller than an inside diameter B of the air core coil, larger quantity of air flow can hit on the second ferromagnetic member 3 to improve the heat radiation performance thereof.

The air core type reactor unit 25 is required to have a reactance of 2 mH to 5 mH, and further, is requested to be used under operating conditions of a frequency of 500-5000 Hz, a current of 100 A or so, and an output voltage of 10 kV. A second insulating plate 6 and a first insulating plate 8 are arranged respectively on one side and the other side of the opening portions of the first air core coil 1 and the second air core coil 2. Insulating spacers 10 are arranged between the second insulating plate 6 and the air core coils and between the first insulating plate 8 and the air core coils. The first insulating stick 5 and the second insulating stick 7 are fastened with a first insulating screw 5a and a second insulating screw 7a, to fix the second insulating plate 6 and the first insulating plate 8.

Figure 5:
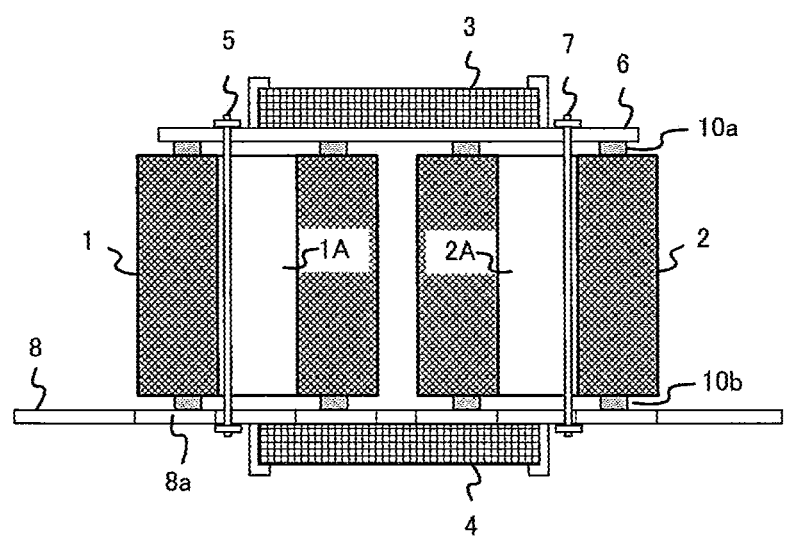
FIG. 5 is a sectional view for showing the air core type reactor unit in connection with Embodiment 1.

FIG. 5 illustrates a sectional view for showing an air core type reactor unit 25 in accordance with the embodiments of the present invention. The air core type reactor unit 25 consists of a first air core coil 1, a second air core coil 2, a first ferromagnetic member 4, a second ferromagnetic member 3, a first insulating stick 5, a second insulating stick 7, a first insulating plate 8, a second insulating plate 6, and the like. The first air core coil 1 has an air core part 1A in a central part thereof. The second air core coil 2 has an air core part 2A in a central part thereof. The first insulating stick 5 penetrates through the air core part 1A of the first air core coil 1. The second insulating stick 7 penetrates through the air core part 2A of the second air core coil 2. Arranging the first insulating stick 5 and the second insulating stick 7 to penetrate through the air core parts of the air core coils makes it possible to down size the main part of the air core type reactor unit. The first insulating stick 5 and the second insulating stick 7 are made from insulators, not from conductors. Magnetic flux density is high on the inside of the air core coils, and moreover, a high frequency power is applied to the coils. If conductors are used for the sticks, an eddy current will flow to generate heat and the sticks will be raised to a high temperature. Accordingly, insulators are employed for the sticks to prevent the heat generation.

Between the second insulating plate 6 and the air core coils, eight insulating spacers 10a (second insulating spacers) are arranged (refer to FIG. 4). Between the first insulating plate 8 and the air core coils, eight insulating spacers 10b (first insulating spacers) are arranged. By providing insulating spacers 10 between the two insulating plates and the air core coils, a creepage distance for insulation from the insulating plate, which is comparable to a potential difference (about 5 kV) between a right winding wire and a left winding wire, is secured.

The first air core coil 1 and the second air core coil 2, which are arranged in parallel, are manufactured to have the same configuration. In order to have more passage of the cooling aerial flow, air holes 8a are provided in the first insulating plate 8 of the lower side (refer to FIG. 7). The second insulating plate 6 of the upper side and the second ferromagnetic member 3, which is attached to this insulating plate, are designed to have a width smaller than the inside diameter B of the coils (refer to FIG. 4). The first insulating plate 8 of the lower side has an area size which is larger than a whole area of the reactor, and wind holes are provided on the insulating plate.

In other words, two boards (the second insulating plate 6 and the first insulating plate 8) are provided respectively at one side and the other side of the opening portions of the two air core coils, as members for fixing the air core coils. The first air core coil 1 and the second air core coil 2 are held and fixed between the first insulating plate 8 and the second insulating plate 6, by way of the insulating spacers 10b (first insulating spacers) and the insulating spacers 10a (second insulating spacers). By providing insulating spacers 10a, 10b between interspaces of the two insulating plates and the air core coils, a creepage distance for insulation from the insulating plate, which is comparable to a potential difference (about 5 kV) of a right winding wire and a left winding wire, is secured.

Figure 6:
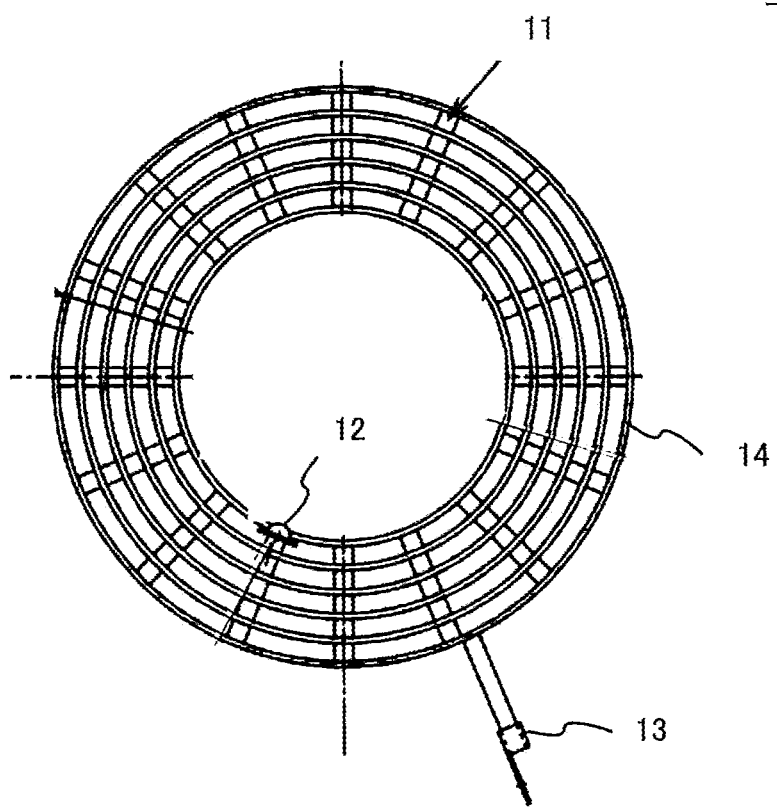
FIG. 6 is a plan view for showing the structure of the air core coil in connection with Embodiment 1.

FIG. 6 shows a plan view of the first air core coil 1 and the second air core coil 2. The first air core coil 1 has an air core part 1A, and includes coil layers 14 (winding wire layers) which are formed with air gaps in between. The second air core coil 2 has an air core part 2A, and includes coil layers 14 (winding wire layers) which are formed with air gaps in between. The first air core coil 1 and the second air core coil 2 have a winding start terminal 12 and a winding end terminal 13, respectively. With regard to the first air core coil 1 and the second air core coil 2, dog bones 11 are employed between interspaces of the winding wire, and the space through which air flow passes is created, in order that those air core coils can be used even under the conditions where a current of 100 A or so with a frequency of 500-5000 Hz might flow into. Moreover, Litz wire, which is not sensitive to the induction heating, is used for the winding wire of the coil layers 14. The Litz wire, which is a twisted product of enameled wires, is referred to also as a twisted wire and is used as a wire rod for a coil of high frequency use.

Figure 7:
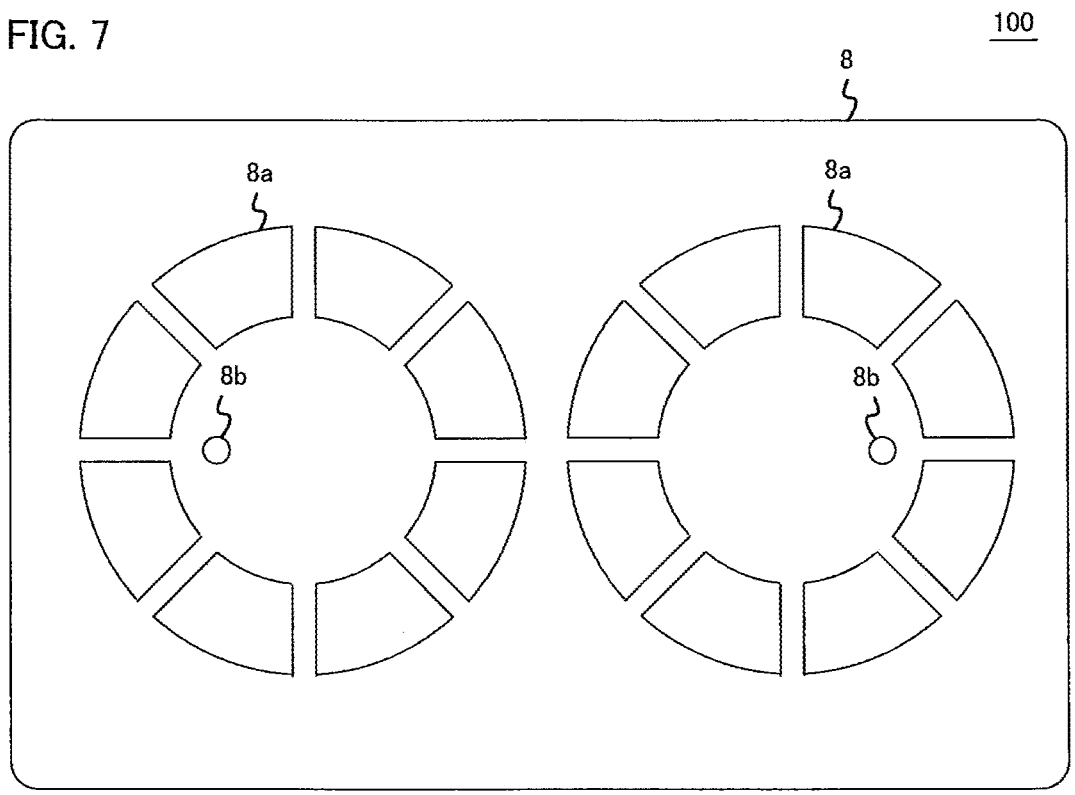
FIG. 7 is a plan view for showing the structure of a first insulating plate according to Embodiment 1.

FIG. 7 shows a plan view of a first insulating plate 8. The first insulating plate 8 is provided with air holes 8a and insulating stick holes 8b. Because the first air core coil 1 and the second air core coil 2 are manufactured to have completely the same configuration, the air holes 8a for passing the cooling aerial flow, have also been provided symmetrically. The first insulating stick 5 and the second insulating stick 7 will be inserted into the insulating stick holes 8b. The coil parts of the first air core coil 1 and the second air core coil 2 will be arranged on the air holes 8a.

Air flow includes two paths; one enters from the air holes 8a that are located at the lower part of the reactor, passes through the air core part 1A and the air core part 2A, and cools the second ferromagnetic member 3, and the other cools the coil bodies themselves by passing from the air holes 8a through the air gaps of the coil layer 14. Each of the paths improves the heat radiation characteristics of the air core type reactor unit. Because the width C of the second ferromagnetic member 3 is made smaller than the inside diameter B of the coil, cooling aerial flow which has passed through the air core part 1A and the air core part 2A hits on the second ferromagnetic member 3. Therefore, the second ferromagnetic member 3 can be cooled efficiently.

Figures 8, 9:
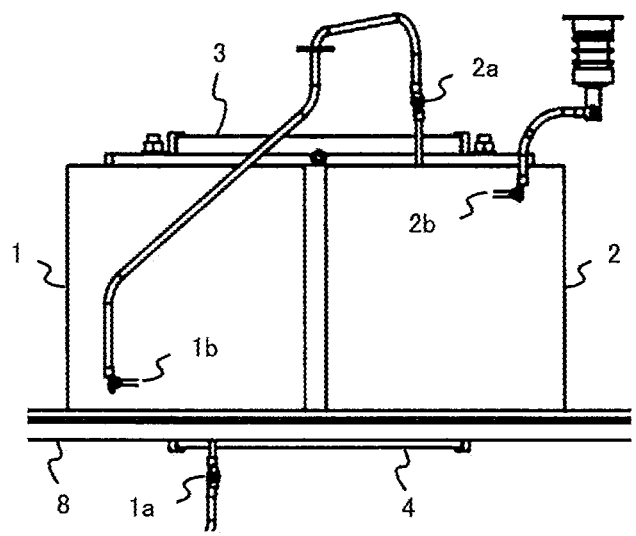
FIG. 8 is an elevational view for showing a connection method of the air core coil in connection with Embodiment 1.
FIG. 9 is a drawing for showing a formula (1) which describes the relation among a reactance, a frequency, and an electric capacity.
Figure 10:
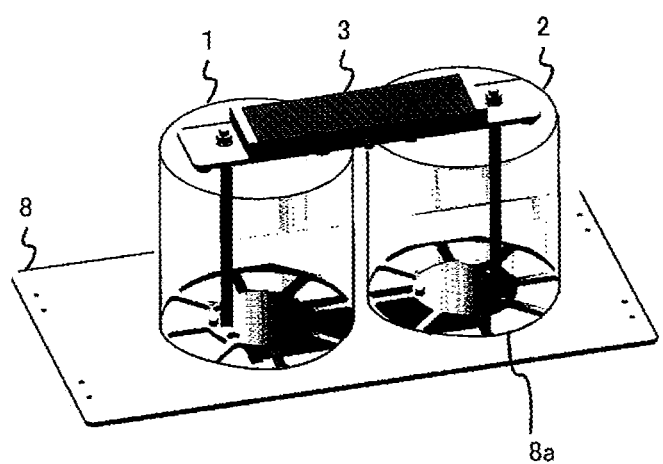
FIG. 10 is a perspective diagram for showing the air core type reactor unit in accordance with Embodiment 1.

FIG. 8 illustrates a wiring connection diagram of winding wires in the air core type reactor unit 25. The first air core coil 1 includes a coil input part 1a and a coil output part 1b. The second air core coil 2 includes a coil input part 2a and a coil output part 2b. The first air core coil 1 and the second air core coil 2, which are manufactured to have the same configuration, are disposed in opposite directions. The coil output part 1b of the first air core coil 1 is connected with the coil input part 2a of the second air core coil 2. Although here is shown an example where two air core coils are placed in opposite directions, it is possible to place the air core coils in the same direction, if electrical connection is performed so that the neighboring magnetic poles of the air core coils may have reverse polarity each other.

The current which flows through the air core type reactor unit 25 is inputted from the coil input part 1a of the first air core coil 1, and outputted, by way of a coil, from the coil output part 1b of the first air core coil 1. Furthermore, the air core type reactor unit 25 has a connection configuration, where the current is inputted from the coil input part 2a of the second air core coil 2, and outputted, by way of a coil, from the coil output part 2b of the second air core coil 2. That is to say, the first air core coil 1 and the second air core coil 2 are electrically connected in series so that the neighboring magnetic poles may have reverse polarity each other, where the both air core coils have the same winding wire direction, have been manufactured in the same configuration, and have been arranged in parallel.

By connecting the air core coils in series, magnetic flux tends to be collected in a loop, which has a path of the air core part 1A→the second ferromagnetic member 3→the air core part 2A→the first ferromagnetic member 4→the air core part 1A. In this way, the magnetic flux which leaks outside is reduced, the eddy current loss which arises in the main circuit case 21 is decreased, and heat generation is lowered. Moreover, by connecting the air core coils in series, a high voltage can be outputted on the output sides of the air core coils. Because components which support the air core coils are made from insulators, a long insulation distance can be attained from a grounding part, and the output of a high voltage can be easily performed.

Next, explanation will be made about the role of the air core type reactor unit 25. In order to generate series resonance with an inductive load such as an ozone generator, and apply a high voltage to the reactor unit, a reactance L is necessary. Reactance L of the air core type reactor unit 25 is related with frequency f and electrostatic capacity C, like Equation (1) which is shown in FIG. 9. The air core type reactor unit 25 in accordance with the present invention has realized a reactance of 2 mH-5 mH. In addition, the operation of the reactor unit has been demonstrated under service conditions at a frequency of 500-5000 Hz, a current of 100 A or so, and an output voltage of 10 kV.

The air core type reactor unit in accordance with the present invention employs the Litz wire which is not so sensitive to the induction heating, so that the reactor unit can be used even under the situations of high frequency and high current. In addition, spaces for cooling the reactor unit is provided between respective layers of the air core coil, and a creepage distance and an insulation thickness, which are large enough to enable a high voltage output, are secured in the air core type reactor unit.

Since the present invention employs a unit configuration which consists of air core coils, insulating plates, and constructional materials, the air core type reactor unit can be incorporated into a panel board as a unit. Moreover, as far as the unit receives an aerial flow of 2 m/s or so from the unit lower part, a coil can be manufactured in the insulation classification class of H kind, even if the power of high frequency and large current is applied to the reactor unit.

According to the present embodiment, an air core type high voltage reactor unit, which is designed for outputting a voltage of 7-15 KV p, is disclosed, where two or more upright air core coils in the same configuration, insulating plates, screws, and sticks are used. The upright air core coils employ Litz wire in the high voltage reactor of series resonance use and are provided with spaces for cooling between respective layers. The insulating plate, the screws, and the sticks, which are made from nonmetallic materials, are provided for fixing these components of the upright air core coils.

Therefore, the air core type reactor unit, according to the present invention, includes; a first insulating plate, provided with a first insulating spacer on one side, a first ferromagnetic member fixed to the first insulating plate, a first air core coil having a first air core part and including coil layers which are formed with an air gap in between, a second air core coil having a second air core part and including coil layers which are formed with an air gap in between, a second insulating plate, provided with a second insulating spacer on one side, a second ferromagnetic member fixed to the second insulating plate, a first insulating stick penetrating through the first air core part of the first air core coil, and a second insulating stick penetrating through the second air core part of the second air core coil, wherein the first air core coil and the second air core coil are arranged in parallel, and are held and fixed between the first insulating plate and the second insulating plate, by way of the first insulating spacer and the second insulating spacer.

Embodiment 2

Figure 11:
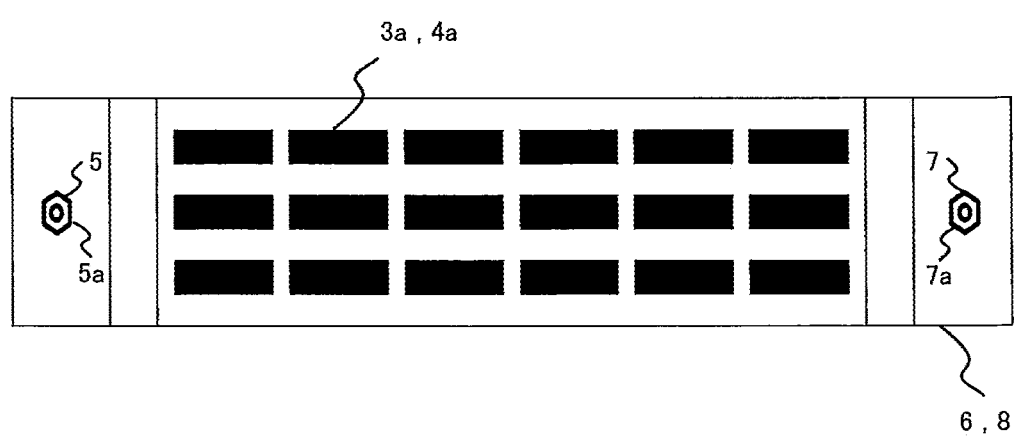
FIG. 11 is a plan view for showing a first structure of a ferromagnetic member in accordance with Embodiment 2.
Figure 12:
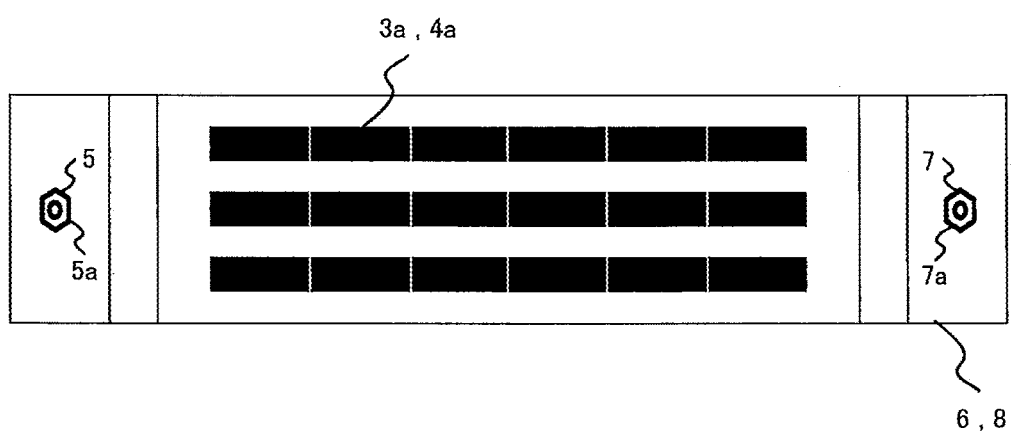
FIG. 12 is a plan view for showing s second structure of the ferromagnetic member in accordance with Embodiment 2.

Explanation will be made on the air core type reactor unit in accordance with Embodiment 2 with reference to FIG. 11 and FIG. 12. The first ferromagnetic member 4 and the second ferromagnetic member 3 consist of two or more first ferromagnetic member boards 4a and two or more second ferromagnetic member boards 3a, and the ferromagnetic members are characterized in that those boards are separated with a separation. By placing those boards with a certain spacing, magnetic flux density is reduced and iron loss can be lowered. Moreover, the ferromagnetic member can improve its own heat radiation performance, by passing aerial flow between the boards. Moreover, most of the ferromagnetic members are made from sintered compact, like a ferrite. A big sized ferromagnetic member is technically hard to sinter from a single plate, and then, an increase in the cost of the ferromagnetic member will be caused. Owing to the situation mentioned above, the cost of the ferromagnetic member will be reduced, by dividing a ferromagnetic member into parts and employing the small sized parts (refer to FIG. 11). It is to be noted that, increase in the leakage magnetic flux can be lowered, by employing a structure where the ferrite members has no spacing in a longitudinal direction and a certain spacing in a width direction (refer to FIG. 12).

Embodiment 3

Figure 13:
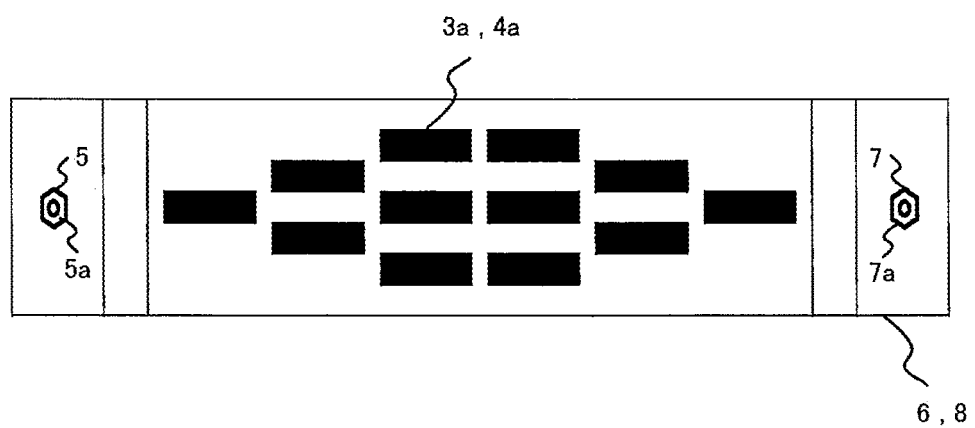
FIG. 13 is a sectional view for showing a first structure of a ferromagnetic member in accordance with Embodiment 3.
Figure 14:
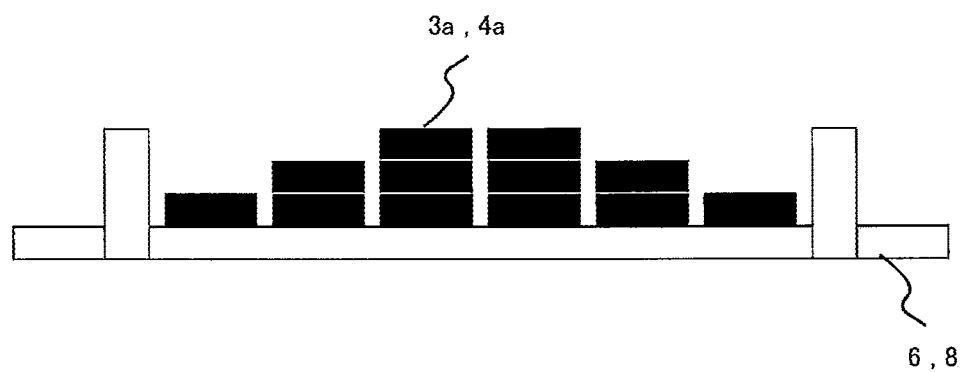
FIG. 14 is a sectional view for showing a second structure of the ferromagnetic member in accordance with Embodiment 3.

Explanation will be made on the air core type reactor unit in accordance with Embodiment 3 with reference to FIG. 13 and FIG. 14. The first ferromagnetic member 4 and the second ferromagnetic member 3 have features in that a greater number of boards are arranged at the central part of the ferromagnetic members than at the end part of the ferromagnetic members, by adjusting the numbers of the first ferromagnetic member boards 4a and the second ferromagnetic member boards 3a. Uniformly distributed magnetic flux density can be attained by placing a greater number of ferromagnetic member boards at the central part than the number of the ferromagnetic member boards at the end part. Lowering the local heat generation in the ferromagnetic member can make the most of the performance as a ferromagnetic member. FIG. 13 shows a method of expressing how first ferromagnetic member boards 4a and second ferromagnetic member boards 3a are arranged on a plane. FIG. 14 shows a method of expressing how first ferromagnetic member boards 4a and second ferromagnetic member boards 3a are accumulated and arranged.

Embodiment 4

Figure 15:
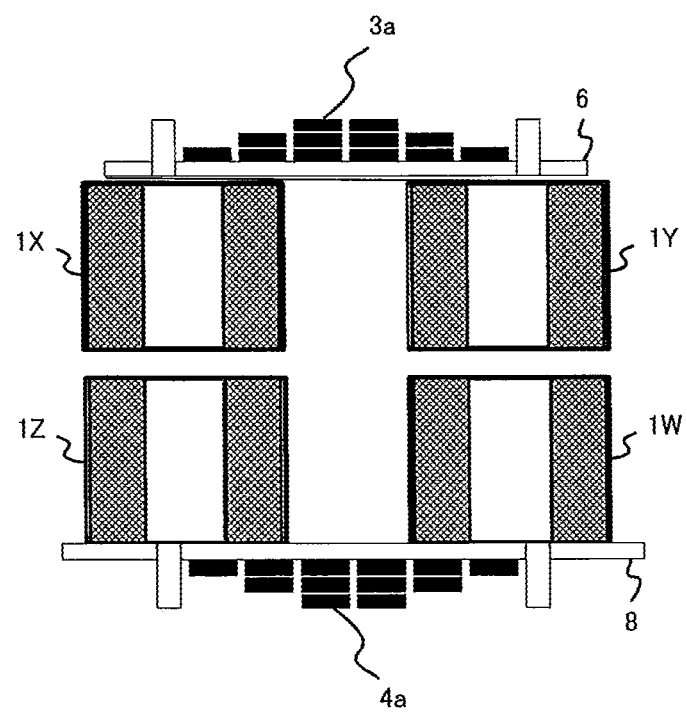
FIG. 15 is an elevational view for showing a first connection method of the air core coil in accordance with Embodiment 4.
Figure 16:
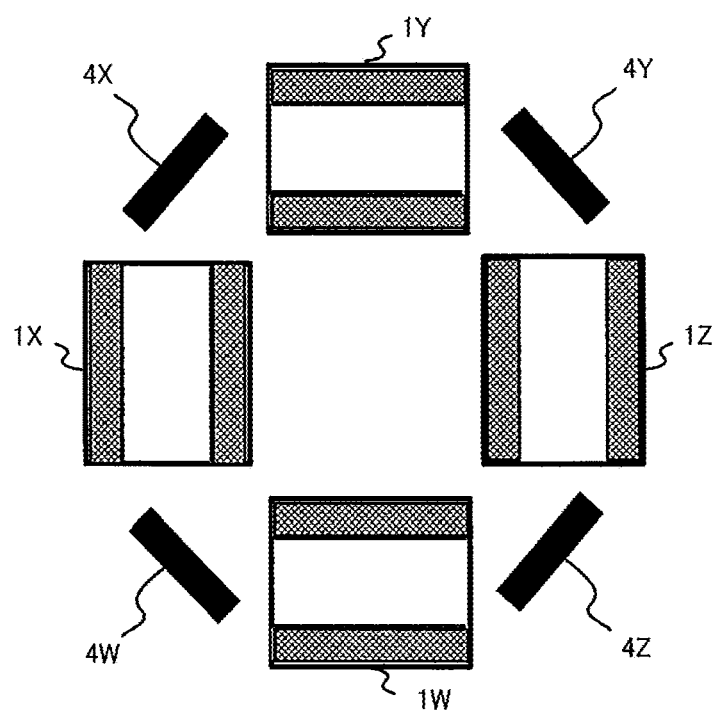
FIG. 16 is an elevational view for showing a second connection method of the air core coil in accordance with Embodiment 4.

Explanation will be made on the air core type reactor unit in accordance with Embodiment 4 with reference to FIG. 15 and FIG. 16. Until now, exemplary cases are shown where two air core coils are arranged in parallel. However, if air core coils in the same configuration are arranged on a plane and electrical connections are made so that the neighboring magnetic poles of the air core coils may have reverse polarity each other, it is possible to use two or more air core coils which are not necessarily arranged in parallel. FIG. 15 shows a case where an air core coil 1X (a first air core coil), an air core coil 1Y (a second air core coil), and an air core coil 1Z (a third air core coil), an air core coil 1W (a fourth air core coil) are accumulated in the up and down direction. Dividing a first air core coil 1 and a second air core coil 2 in the up and down direction can be accepted in the present embodiment. FIG. 16 shows a case where the air core coil 1X, the air core coil 1Y, the air core coil 1Z, and the air core coil 1W are annularly arranged. At each interspace among the air core coils 1X-1W, a ferromagnetic member 4X (a first ferromagnetic member), a ferromagnetic member 4Y (a second ferromagnetic member), a ferromagnetic member 4Z (a third ferromagnetic member), and a ferromagnetic member 4W (a fourth ferromagnetic member) are arranged. The use of air core coils will be allowed in the present embodiment, even if the coils are not arranged in parallel, when efforts to cool by wind are made for the cooling spaces between each coil layer, the ferromagnetic members, and the like.

Note that, in the present invention, each of the embodiments can be freely combined, appropriately modified and/or eliminated without departing from the scope of the invention.

EXPLANATION OF NUMERALS AND SYMBOLS

1 First Air Core Coil, 1A Air Core Part, 1a Coil Input Part, 1b Coil Output Part, 2 Second Air Core Coil, 2A Air Core Part, 2a Coil Input Part, 2b Coil Output Part, 3 Second Ferromagnetic Member, 3a Second Ferromagnetic Member Board, 4 First Ferromagnetic Member, 4a First Ferromagnetic Member Board, 5 First Insulating Stick, 5a Insulating Screw, 6 Second Insulating Plate, 7 Second Insulating Stick, 7a Insulating Screw, 8 First Insulating Plate, 8a Air Hole, 8b Insulating Stick Hole, 10 Insulating Spacer, 10a Insulating Spacer, 10b Insulating Spacer, 11 Dog Bone, 12 Winding Start Terminal, 13 Winding End Terminal, 14 Coil Layer, 21 Main Circuit Case, 22 Heat Exchanger, 23 Input Transformer, 24 Inverter, 25 Air Core Type Reactor Unit, 26 Cooling Water Pipe Line, 27 Fan, 28 Air Flow Path, 29 Protective Panel, 30 Air Flow Path Partition Board, 31 Door, 50 Electric Power Supply Equipment, 60 Ozone Generator, 70 Ozone Supply Facility

What is claimed is:

1. An air core type reactor unit, comprising:
a first ferromagnetic member;
an air core coil which is composed of two or more solenoid type coils, each having an air core part;
an insulating plate; and
a second ferromagnetic member attached to the insulating plate, wherein the second ferromagnetic member and the insulating plate each have a width that is smaller than an inside diameter of the air core coil.

2. The air core type reactor unit according to claim 1, wherein the air core coil is configured to have coil layers which are formed with an air gap in between.

3. The air core type reactor unit according to claim 2, wherein the first ferromagnetic member and the second ferromagnetic member include a plurality of boards and those boards are held with a space in between.

4. The air core type reactor unit according to claim 3, wherein the first ferromagnetic member and the second ferromagnetic member are configured to have a greater number of boards at a central part than at an end part.

5. The air core type reactor unit according to claim 2, wherein the first ferromagnetic member and the second ferromagnetic member are arranged to have no spacing in a longitudinal direction and a certain spacing in a width direction.

6. The air core type reactor unit according to claim 2, wherein the air core coil includes two or more air core coils in the same configuration which are arranged on a plane, and electrical connections are made so that the neighboring magnetic poles of the air core coils may have reverse polarity with respect to each other.

7. An electric power supply equipment comprising;
an input transformer which outputs alternating current power,
an inverter which inputs an output of the input transformer and outputs direct current power, and
an air core type reactor unit of claim 2, arranged at an output side of the inverter.

8. The air core type reactor unit according to claim 1, wherein the first ferromagnetic member and the second ferromagnetic member include a plurality of boards and those boards are held with a space in between.

9. The air core type reactor unit according to claim 8, wherein the first ferromagnetic member and the second ferromagnetic member are configured to have a greater number of boards at a central part than at an end part.

10. An electric power supply equipment comprising;
an input transformer which outputs alternating current power,
an inverter which inputs an output of the input transformer and outputs direct current power, and
an air core type reactor unit of claim 9, arranged at an output side of the inverter.

11. The air core type reactor unit according to claim 8, wherein the air core coil includes two or more air core coils in the same configuration which are arranged on a plane, and electrical connections are made so that the neighboring magnetic poles of the air core coils may have reverse polarity with respect to each other.

12. An electric power supply equipment comprising;
an input transformer which outputs alternating current power,
an inverter which inputs an output of the input transformer and outputs direct current power, and
an air core type reactor unit of claim 8, arranged at an output side of the inverter.

13. The air core type reactor unit according to claim 1, wherein the first ferromagnetic member and the second ferromagnetic member are arranged to have no spacing in a longitudinal direction and a certain spacing in a width direction.

14. The air core type reactor unit according to claim 13, wherein the air core coil includes two or more air core coils in the same configuration which are arranged on a plane, and electrical connections are made so that the neighboring magnetic poles of the air core coils may have reverse polarity with respect to each other.

15. An electric power supply equipment comprising;
an input transformer which outputs alternating current power,
an inverter which inputs an output of the input transformer and outputs direct current power, and
an air core type reactor unit of claim 13, arranged at an output side of the inverter.

16. The air core type reactor unit according to claim 1, wherein the air core coil includes two or more air core coils in the same configuration which are arranged on a plane, and electrical connections are made so that the neighboring magnetic poles of the air core coils may have reverse polarity with respect to each other.

17. An electric power supply equipment comprising;
an input transformer which outputs alternating current power,
an inverter which inputs an output of the input transformer and outputs direct current power, and
an air core type reactor unit of claim 16, arranged at an output side of the inverter.

18. An electric power supply equipment comprising;
an input transformer which outputs alternating current power,
an inverter which inputs an output of the input transformer and outputs direct current power, and
an air core type reactor unit of claim 1, arranged at an output side of the inverter.

* * * * *